United States Patent [19]
Hazen

[11] 3,735,635
[45] May 29, 1973

[54] TRUE AIRSPEED MEASURING APPARATUS

[75] Inventor: Edward J. Hazen, Woodcliff Lake, N.J.

[73] Assignee: The Bendix Corporation, Teterboro, N.J.

[22] Filed: Dec. 21, 1970

[21] Appl. No.: 100,241

[52] U.S. Cl. .....................73/181, 73/178 H, 73/189
[51] Int. Cl. ...............................................G01c 21/10
[58] Field of Search ....................73/181, 178 H, 399, 73/189

[56] References Cited

UNITED STATES PATENTS

| | | | |
|---|---|---|---|
| 3,070,999 | 1/1963 | Garbell | 73/178 H |
| 2,661,624 | 12/1953 | Bechberger et al. | 73/181 X |
| 2,536,037 | 1/1951 | Clousing et al. | 73/181 |

*Primary Examiner*—Donald O. Woodiel
*Attorney*—Anthony F. Cuoco and Plante, Hartz, Smith and Thompson

[57] ABSTRACT

Apparatus relying on the adiabatic temperature rise due to stopping a moving stream of air for determining the velocity of that air. Temperature sensors are mounted at opposite ends of a rotating arm for eliminating the need to measure static temperature and for providing a linear relationship between velocity and temperature measurements.

7 Claims, 5 Drawing Figures

PATENTED MAY 29 1973     3,735,635

INVENTOR.
EDWARD J. HAZEN
BY
ATTORNEY

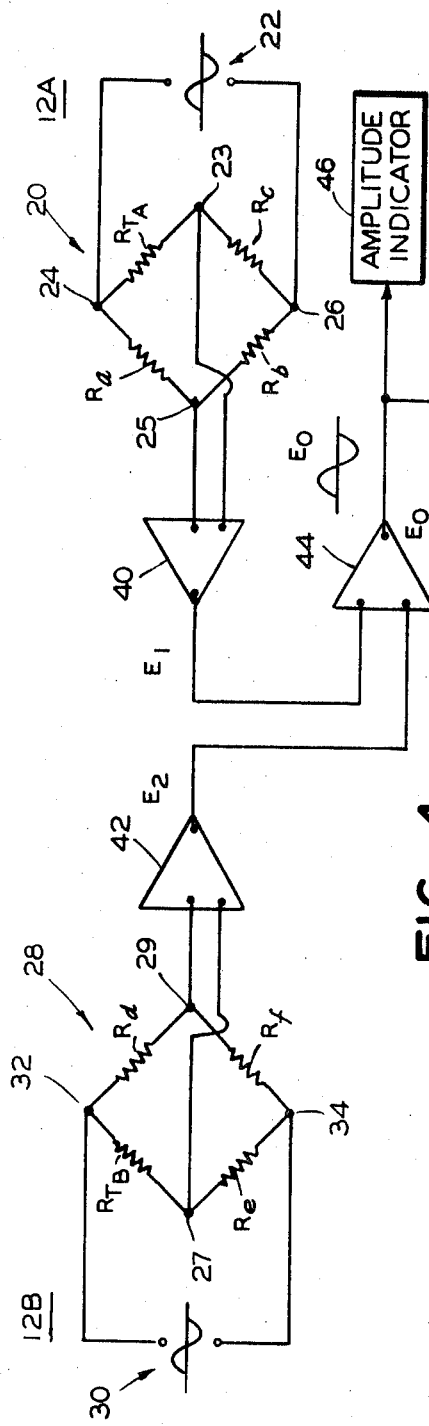
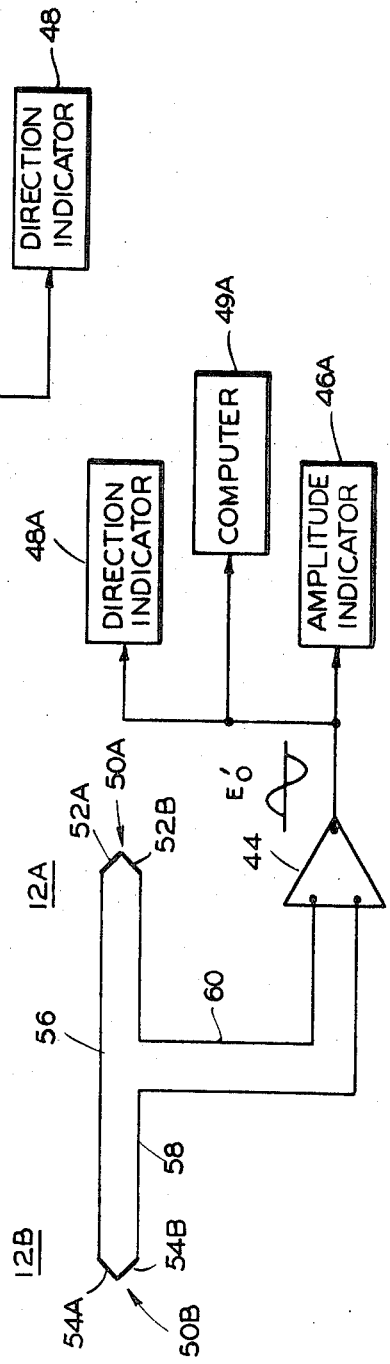
FIG. 4
FIG. 5

TRUE AIRSPEED MEASURING APPARATUS

BACKGROUND OF THE INVENTION

1. Field of the Invention

This invention relates to apparatus applicable to low speed flight craft for measuring airspeed magnitude and direction and, more particularly, to apparatus of the kind described for providing said measurements directly and with increased accuracy.

2. Description of the Prior Art

Low speed flight craft such as V/STOL or helicopter craft require airspeed measuring apparatus. Prior to the present invention, impact pressure has been used to provide the measurement, but this yields indicated airspeed, and barometric pressure and ambient temperature corrections must be applied to determine true airspeed. A prior art device of this kind is described in U. S. Pat. No. 3,373,605 issued Mar. 19, 1968 to J. L. Beilman.

SUMMARY OF THE INVENTION

This invention is an improvement over such prior art devices and contemplates temperature sensors mounted to opposite ends of an arm rotating in a plane parallel to the plane of forward motion of the flight craft. As the craft moves, the sensors each sense different instantaneous temperatures depending on the angular position of the arm and speed of the craft. The magnitude of the temperature difference varies approximately sinusoidly and, if a constant rotational speed is assumed, a direct measurement of vehicle airspeed and air direction is provided.

One object of this invention is to accurately and directly measure true airspeed and air direction of a low speed flight vehicle and to avoid the need for barometric pressure and ambient temperature corrections.

Another object of this invention is to provide said measurements by relying on the adiabatic temperature rise due to stopping a moving stream of air.

Another object of this invention is to eliminate the need for static temperature measurement and to utilize total temperature measurement for determining airspeed magnitude and direction.

Another object of this invention is to linearize the relationship between airspeed and temperature measurements.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

DESCRIPTION OF THE DRAWINGS

FIG. 4 is a combination block diagram-electrical schematic showing an embodiment of the invention wherein resistance thermometers are used as temperature sensors.

FIG. 5 is a block diagram of another embodiment of the invention wherein thermocouples are used as temperature sensors.

DESCRIPTION OF THE INVENTION

Figure 1:
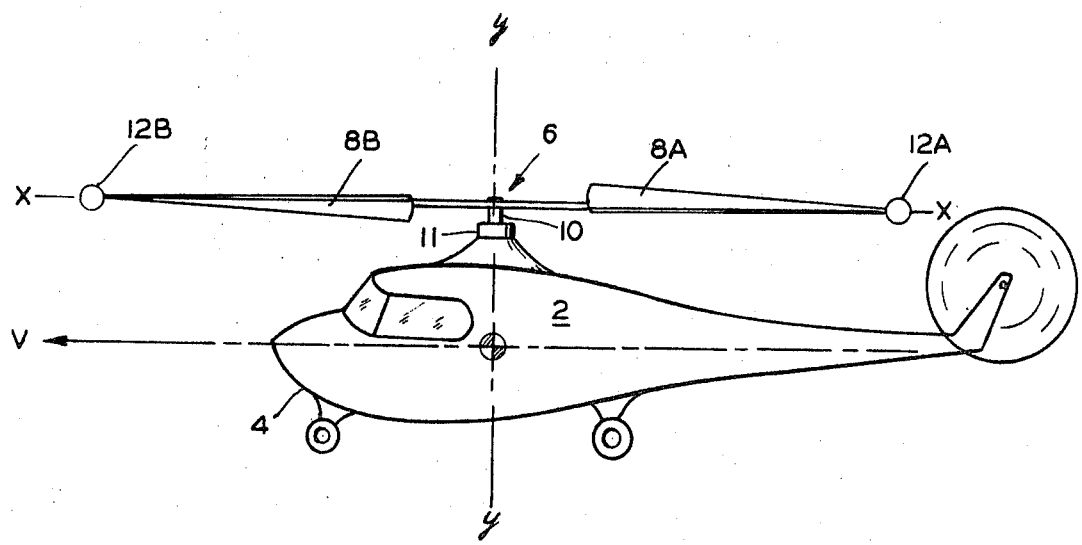
FIG. 1 is a pictorial representation of a helicopter employing the airspeed measuring apparatus described herein.

FIG. 1 shows a low speed aircraft such as a helicopter 2 having a body or frame 4 and a rotor 6. Rotor 6 includes a pair of diametrically opposed and substantially horizontal blades 8A and 8B mounted on a shaft 10 which is driven by a motor 11, such as is well known in the art, to rotate about axis $y—y$ at a constant rate. Helicopter 2 is moving at a relatively low true airspeed V in a plane substantially parallel to the plane of rotation of rotor 6. A temperature sensor 12A is mounted at the end of blade 8A and a similar temperature sensor 12B is mounted at the end of blade 8B.

Figure 2:
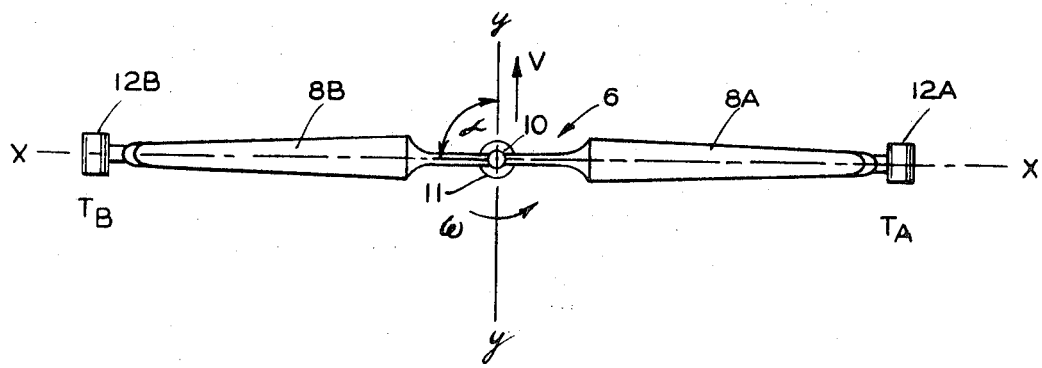
FIG. 2 is a diagrammatic plan view showing helicopter rotor blades and temperature sensors mounted at the ends thereof according to the invention.

As shown in FIG. 2, rotor 6 rotates at an angular velocity $\omega$ and the instantaneous angular displacement ($\omega t$) of the rotor blades from the velocity vector of helicopter 2 is designated as $\alpha$.

It is known that the adiabatic temperature rise, due to stopping a moving stream of air is a function of the velocity of that air. The relationship may be expressed as follows:

$$C_p T_T = C_p T_s + V^2/2$$

or $$T_T = T_s + (1/2\ cp)\ V^2 \qquad (1)$$

where $C_p$ is the specific heat of the air at constant pressure; $T_T$ is the total temperature of the air; $T_s$ is the static temperature and $V$ is true airspeed.

Various means have heretofore been tried to make use of this relationship for measuring true airspeed but have not been successful, primarily because of the difficulty in measuring static temperature ($T_s$). The device of the invention, as will be shown, eliminates the necessity for measuring static temperature and linearizes the relationship between airspeed and temperature measurements to have utility at relatively low airspeeds.

Considering the arrangement shown in FIGS. 1 and 2, if axis $y—y$ is stationary, then the temperatures sensed by sensors 12A and 12B will be the same for all angular displacements $\alpha$ of rotor 6. However, when helicopter 2 and axis $y—y$ move at a velocity $V$, the instantaneous temperatures ($T_A$ and $T_B$) sensed by sensors 12A and 12B respectively, will be different depending on the angular position of rotor 6 and craft velocity V. This is so because at one angular position of sensor 12A the craft velocity ($V$) is added to the rotational velocity ($V_\omega$) of the sensor while simultaneously the craft velocity ($V$) is subtracted from the rotation velocity ($V_\omega$) of sensor 12B.

With reference to the vector diagram of FIG. 3, wherein $V$ is an airspeed component of sensors 12A and 12B due to the forward speed of craft 2, $V_\omega$ is an airspeed component due to the rotation of sensors 12A and 12B and $V_A$ and $V_B$ are resultant airspeeds of the respective sensors 12A and 12B, total temperature ($T_T$) in accordance with the relationship in equation (1), may be expressed as follows:

$$T_{T_A} = T_s + (1/2\ cp)V_A^2 \qquad (1A)$$

$$T_{T_B} = T_s + (1/2\ cp)V_B^2 \qquad (1B)$$

The difference in the total temperature $\Delta T$, measured by sensor 12A and 12B, may be expressed as follows:

$$\Delta T = T_{T_A} - T_{T_B} = [T_s + (1/2\ cp)V_A^2] - [T_s + (1/2\ cp)V_B^2]$$

$$\Delta T = (1/2\ cp)(V_A^2 - V_B^2) \qquad (1C)$$

Figure 3:
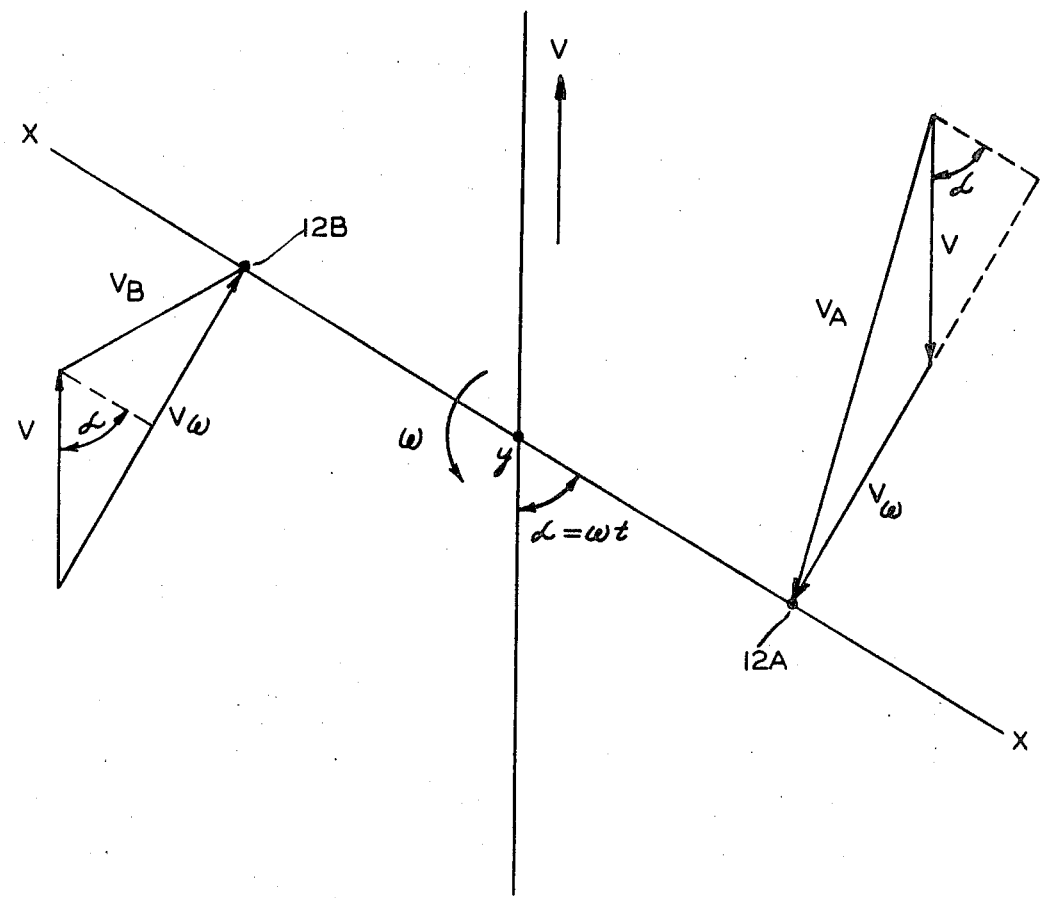
FIG. 3 is a vector diagram showing component and resultant velocities of the aforenoted sensors due to the rotation of the helicopter blades and the forward flight of the craft.

From FIG. 3:

$$V_A^2 = (V_\omega + V \sin\alpha)^2 + (V \cos\alpha)^2$$

$$V_A^2 = V_\omega^2 + 2VV_\omega \sin\alpha + V^2 \qquad (2)$$

and;

$$V_B^2 = (V_\omega - V\sin\alpha)^2 + (V\cos\alpha)^2$$

$$V_B^2 = V_\omega^2 - 2VV_\omega \sin\alpha + V^2 \qquad (3)$$

Substituting the values for $V_A^2$ and $V_B^2$ from equations (2) and (3) into equation (1C) the following is obtained:

$$\Delta T = (1/2\ cp)\ [(V_\omega^2 + VV_\omega \sin\alpha + V^2) - (V_\omega^2 - 2VV \sin\alpha + V^2)]$$

$$\Delta T = (1/2\ cp)(4VV_\omega \sin\alpha)$$

$$\Delta T = (4V_\omega /2\ cp)V \sin\alpha$$

Since $C_p$ is a constant for air below a temperature of 1,000° R and since $V_\omega$ may be held constant by design;

$$\Delta T = KV \sin\alpha \qquad (4)$$

where K is a constant equal to $(4 V_\omega /2\ cp)$.

Thus, it is seen that true airspeed may be measured by sensing the difference in total temperature ($\Delta T$) between advancing and retreating sensors 12A and 12B, respectively, mounted to rotating blades 8A and 8B, and that the airspeed varies linearly with the temperature difference at constant rotational velocity. Moreover, the magnitude of the temperature difference varies sinusoidly with angular displacement $\alpha$ and is at a maximum when $\alpha$ is 90°.

With the foregoing analysis in mind, one embodiment of the invention is shown in FIG. 4, wherein temperature sensors 12A and 12B are resistance thermometers operating on the basic principle that the resistance of a metallic conductor changes with temperature. These devices generally include a calibrated coil of wire, often platinum, placed in the location where the temperature is to be determined, together with circuitry for measuring the resistance. A sensor of this kind which is satisfactory for purposes of the invention is the total temperature sensor including an hermetically sealed platinum resistance thermometer manufactured by the Rosemont Engineering Co., Minneapolis, Minn., and described in their Bulletin 126027.

With reference then to FIG. 4, sensor 12A includes a resistance $R_{T_A}$ which, with a resistance $R_a$, forms two arms of a Wheatstone Bridge 20, with the remaining arms of the bridge formed by resistances $R_b$ and $R_c$. An a.c. source 22 is connected at a terminal 24 intermediate resistances $R_{T_A}$ and $R_a$ and is connected at a terminal 26 intermediate resistances $R_b$ and $R_c$.

Sensor 12B includes a resistance $R_{T_B}$ which, with a resistance $R_d$, forms two arms of a Wheatstone Bridge 28, with the remaining arms of the bridge formed by resistance $R_e$ and $R_f$. An a.c. source 30 is connected at a terminal 32 intermediate resistances $R_{T_B}$ and $R_d$ and is connected at a terminal 34 intermediate resistances $R_e$ and $R_f$.

The output of bridge 20 taken across terminals 23 and 25 intermediate resistances $R_{T_A}$ and $R_c$ and $R_a$ and $R_b$, respectively, is applied to an amplifier 40 which provides an amplified voltage $E_1$ corresponding to temperature $T_A$ sensed by sensor 12A.

The output of bridge 28 taken across terminals 27 and 29 intermediate resistances $R_d$ and $R_e$ and $R_{T_B}$ and $R_f$, respectively, is applied to an amplifier 42 which provides an amplified voltage $E_1$ corresponding to temperature $T_B$ sensed by sensor 12B.

Voltages $E_1$ and $E_2$ are applied to a summing amplifier 44 which sums the voltages and provides an amplified, sinusoidal summation voltage $E_0$ as follows:

$$E_0 = E_1 - E_2 = K_1(T_A - T_B) = K_1(\Delta T) \qquad (5)$$

Voltage $E_0$ is applied to an amplitude indicator designated generally by the numeral 46. Since the maximum amplitude of voltage $E_0$ varies with temperature and hence airspeed is heretofore shown, amplitude indicator 46 may be a conventional type voltmeter calibrated in terms of airspeed for the constant rotational speed ($\omega$) of rotor 6 so that airspeed may be read directly by the pilot of the craft.

It will now be understood that the speed of craft 2 in any direction causes the airspeed indication from sensors 12A and 12B on rotor 6 to vary sinusoidally during each revolution of rotation. Thus, the variation in airspeed indication during a revolution has a phase relationship, as compared with the craft fore and aft (longitudinal) axis, to the direction of air flow. In other words, the amplitude and phase of signal $E_0$ have a specific relation to the airspeed and direction of craft 2, respectively.

An indication of air direction may be obtained by comparing the phase of signal $E_0$ with a signal having a fixed phase relationship to the craft. Accordingly, signal $E_0$ is applied to a direction indicator 48 which may be an induction type device having a pair of windings cooperating in a well known manner to position a pointer according to the phase relationship between $E_0$ and a fixed phase signal. An example of one such device suitable for purposes of the present invention is illustrated in U. S. Pat. No. 2,524,747 issued to W. A. Ayers, et al on Oct. 10, 1950, it being understood that other devices well known in the art may also operate on signal $E_0$ for providing a direction indication, the same not being the subject of this invention.

Alternately, signal $E_0$ from amplifier 44 may be applied to a utilizing device such as a computer 49 which computes flight data therefrom for aiding the pilot in flying the craft.

In another embodiment of the invention illustrated in FIG. 5, sensors 12A and 12B may be conventional bimetallic thermocouples. Sensors of this type have the advantage of providing the desired information simply and with reduced electrical circuitry.

With reference then to FIG. 5, sensor 12A includes a thermocouple 50A having dissimilar metallic members 52A and 52B and sensor 12B includes a thermocouple 50B having dissimilar metallic members 54A and 54B. Members 52A and 54A are connected by a conductor 56. Member 54B terminates in an output conductor 58 and member 52B terminates in an output conductor 60, with a sinusoidal signal $E_0'$ corresponding to airspeed provided across conductors 58 and 60. Signal $E_0'$ is applied to an amplitude indicator 46A and to a direction indicator 48A for indicating magnitude and direction of airspeed. Alternatively, signal $E_0'$ may be applied to a utilizing device such as a computer 49A.

With the above description of the invention in mind it will now be seen that means are provided for directly measuring true airspeed, eliminating additional measurement and avoiding disadvantages of other devices which detract from the accuracy of the measurement. Moreover, the need for measuring static temperature is eliminated and the relationship between airspeed and temperature measurements is linearized, making the implementation simple and useful down to the very low airspeeds.

Although only two embodiments of the invention have been illustrated and described, various changes in the form and relative arrangements of parts, which will now appear to those skilled in the art may be made without departing from the scope of the invention. Reference is, therefore, to be had to the appended claims for a definition of the limits of the invention.

What is claimed is:

1. True fluid speed measuring apparatus comprising:
    a rotatably mounted arm supported for movement in a fluid stream;
    means for moving the arm in the fluid stream;
    means for rotating the moving arm at a substantially constant rate;
    temperature sensors mounted at opposite ends of the arm for sensing instantaneous total temperatures in accordance with the angular displacement of the arm and the speed of the arm in the stream and commensurate with the adiabatic temperature rise due to movement of the arm in the stream, and for providing corresponding signals; and
    summing means connected to the sensors and responsive to the signals therefrom for providing a signal corresponding to the summation of said signals, said summation signal being a measurement of true fluid speed.

2. Apparatus as described by claim 1, wherein the temperature sensors include:
    resistance thermometers having metallic conductors of changing resistance in accordance with temperature; and
    circuit means for measuring instantaneous resistance changes and for providing the corresponding signals in accordance therewith.

3. Apparatus as described by claim 1, wherein the temperature sensors include:
    thermocouples having dissimilar metallic members for sensing instantaneous temperature changes and for providing the corresponding signals in accordance therewith.

4. Apparatus as described by claim 1, including:
    indicating means connected to the summing means and responsive to the summation signal for indicating fluid direction.

5. Apparatus as described by claim 1, including:
    indicating means connected to the summing means and responsive to the summation signal for indicating true fluid speed.

6. Apparatus as described by claim 4, wherein the summation signal is an alternating signal and the indicating means includes:
    means for comparing the phase of the alternating signal with a signal having a fixed phase relationship with the direction of movement of the arm in the fluid stream.

7. Apparatus for measuring airspeed of a helicopter type craft, comprising:
    temperature sensors mounted at opposite ends of a helicopter rotor blade rotating at a substantially constant rate;
    said temperature sensors being effective for sensing instantaneous total temperatures in accordance with the angular displacement of the rotor blade and the speed of the craft, commensurate with the adiabatic temperature rise due to movement of the blade through the air, and for providing corresponding signals; and
    summing means connected to the sensors for summing the signals therefrom and for providing a summation signal, said signal being a measurement of true airspeed.

\* \* \* \* \*